Patented July 30, 1940

2,209,492

UNITED STATES PATENT OFFICE 2,209,492

PROCESS FOR PREPARING CATALYSTS

William E. Spicer, Baton Rouge, La., assignor to Standard-I. G. Company

No Drawing. Application January 20, 1938, Serial No. 185,908

2 Claims. (Cl. 23—233)

This invention relates to an improved process for preparing catalysts for reactions conducted at high temperatures of the order of 900° F. and upwards, and more particularly to an improved method for preparing strong catalysts by forming tablets, pills, or other lumps by compressing a powder containing active catalytic elements such as difficultly reducible oxides. It is a special object of this invention to provide a process for making strong catalysts in pill form containing nickel and a difficultly reducible oxide for use in the production of hydrogen by the reaction between steam and a hydrocarbon.

Hydrogen is prepared by passing a hydrocarbon vapor (preferably a normally gaseous hydrocarbon) and steam or carbon dioxide over a catalyst containing nickel, or other suitable metal, at a high temperature. It has been suggested to use oxides of metals which are not reducible by hydrogen at the reaction temperature as a diluent and support for the catalytic metal. Alumina, silica, chromic oxide and magnesia are examples of suitable oxides, but any oxide which is not reduced by hydrogen at temperatures of about 2000 to 3000° F. and which is solid at 2000° F., is suitable for this purpose.

The production of hydrogen from hydrocarbons and steam involves high temperatures and gas rates which cause a rapid reduction of many catalysts to powder, or dust, and render them unsuitable. It is accordingly desirable to use very rugged catalysts in this process, but at the same time the catalysts must also show a high degree of activity.

One method for preparing strong catalysts is by grinding into a powder a mixture of the catalyst components, and then compressing this powder into lumps or tablets with application of high pressure, preferably above 5000 to 7500 pounds per square inch. These tablets are further strengthened by the addition of small amounts of inorganic compounds which react with the metal oxides to form metal compounds which have a fusion temperature above the maximum temperature at which the catalyst is exposed in use, say above 2000 to 3000° F. Such inorganic compounds are preferably weakly acidic, when the difficultly reducible oxide is basic, and have a melting point below about 1000 to 1500° F., in order to permit intimate mixing and rapid reaction with the metal oxides of the catalyst composition. Examples of such inorganic compounds which may be used are the acids, oxides and salts of fluorine, silicon, tin, germanium, bismuth, aluminum, lead, boron, tungsten, and the like, such as sodium fluoride, silica, sodium silicate, alumina, boric acid and tungstic acid. When the metal oxide associated with the nickel is alumina, chromium oxide or some other acidic oxide, the substance added to impart strength is preferably a basic oxide such as magnesia or some other alkaline earth oxide. Such compounds are added in small amounts of usually about ½ to 2 to 10%, though these limits may be exceeded. Strength is imparted to the catalyst by these additions only when the catalyst mixture is heated up during its preparation to a temperature sufficiently high to cause a reaction to occur between the difficultly reducible oxide and the added substance, usually at a temperature not less than 1700° F.

The catalyst preferably contains a larger amount of the metal oxide than of nickel or other active catalytic metal. For example, the catalyst may consist of 50% or more of magnesia and the remainder of a catalytic metal such as nickel. Catalysts containing about 75% of magnesia and 25% of nickel are preferred.

If a small amount of a lubricant is present in the powdered catalyst composition and the compressed tablets are then treated so as to remove the lubricant, both the formation of the tablets and the tablets themselves are greatly improved. The lubricant is preferably one that is combustible, and is completely removed from the catalyst tablets on heating to a temperature above about 1600° F. in air. A preferred lubricant is graphite. Other suitable lubricants are the fatty acids, such as stearic acid, oleic acid, and the mixed fatty acids obtained on limited oxidation of paraffin wax; also high boiling viscous esters such as the natural glyceride esters of the fatty acids, including the natural oils, fats, and waxes, also hydrocarbon lubricants such as the petroleum lubricating oils and waxes. Since nickel catalysts are sensitive to even slight traces of sulfur, it is preferable that the lubricants used with such catalysts be substantially free of sulfur.

It has been observed that tablets prepared with such lubricants often have fractured ends (or "caps," that separate easily from the cylindrical mass of the tablets) and a laminar structure which is attended by weakness of the tablet.

Water has frequently been used as a lubricant in preparing tablets of powdered material under high pressures. The amount of water required for satisfactory operation of punch and die presses with inorganic oxides such as used in the catalysts described herein, is in general quite large, from 25 to 30% of water in the mixture being required for proper lubrication. Although the tablets obtained when using water in such large amounts are initially quite strong, they become very weak and disintegrate when heated to high temperatures such as are used in the preparation of hydrogen from hydrocarbons and steam. The use of smaller amounts of water below about 10% has been tried but has been found unsatisfactory as improper lubrication of the presses results and the tablets are initially much weaker and are often improperly formed or fractured.

It has now been found that greatly improved results are obtained if both a limited amount of water, below about 10%, preferably about 5% and above 1%, and a small amount between about ½ and 2% of a combustible lubricant such as graphite, are present in the catalyst powder to be tableted. The tablets prepared from such mixtures are initially quite strong, are properly and uniformly formed and do not weaken in service in the preparation of hydrogen from hydrocarbons and steam. The operation of the presses is also much improved, lubrication is satisfactory and there is no tendency to lamination or capping in the tablets formed.

The following examples are presented to indicate suitable specific embodiments of the present invention, and are not to be considered as limiting this invention in any way:

Example I

A powdered mixture of 75 parts of magnesium oxide and 25 parts of nickel oxide, after heating to 850–900° F., was passed through a 10 mesh screen and was then formed into a dense mass by compression, using pressures of the order of 10,000 pounds per square inch in a tablet machine. The tablets were in the form of right cylinders, ⅝ inch in diameter and ⅝ inch in height. The operation of the presses was irregular and many tablets were imperfectly formed, showing decided lamination and capping. The dies and punches of the tabletting machine rapidly became clogged after only a few tablets were formed, requiring repeated shut-downs for cleaning.

Example II

Tablets were prepared as in Example I, with the exception that 1% of graphite was mixed thoroughly with the heated powder of nickel and magnesium oxides before the tabletting operation. While the tabletting operation was conducted much more smoothly than in Example I, the tablets still showed a pronounced tendency to lamination and only a very small percentage failed to split or cap.

Example III

Tablets were formed as in Example I with the exception that 5% of water was mixed thoroughly with the heated powder of nickel and magnesium oxides before the tabletting operation. No appreciable advantage was observed in operation of the tabletting machine over Example I. No lubricating effect of this amount of water was observed.

Example IV

Tablets were prepared as in Example I with the exception that 1% of graphite and 5% of water were added as in Examples II and III. The tabletting machine operated smoothly with satisfactory lubrication, it being unnecessary to clean the punches and dies except after long use. There was substantially no tendency to capping or lamination of the tablets, only a very small percentage being broken. The tablets were then heated in air to a temperature of 1700 to 2000° F. for about 36 hours. The nickel oxide in the heated tablets was then reduced to metallic nickel by passing hydrogen over them at the same temperature for about 6 hours.

These tablets showed high activity in the preparation of hydrogen from methane and steam. They were also quite hard and strong, showing little tendency to dusting or deterioration in use.

Various modifications may obviously be made in the methods described above without departing from the scope of this invention, which is not to be limited by any examples or explanations presented herein, all of which are presented solely for purpose of illustration. This invention is to be limited only by the following claims, in which it is desired to claim all novelty insofar as the prior art permits.

I claim:

1. Process for preparing an improved catalyst, comprising mixing into a powder nickel oxide a greater amount of magnesium oxide, about 1 to 10% of water and about ½ to 2% of graphite, tabletting said powder into tablets of high physical strength, heating the tablets in an oxidizing atmosphere at a temperature above about 1600° F. and then heating in a reducing atmosphere at about said temperature.

2. Process for preparing an improved catalyst, comprising mixing into a powder nickel oxide, a greater amount of magnesium oxide, about 5% of water and about 1% of graphite, tabletting said powder into tablets of high physical strength, heating the tablets in an oxidizing atmosphere at a temperature above about 1600° F. and then heating in a reducing atmosphere at about said temperature.

WILLIAM E. SPICER.